United States Patent
Zielinski et al.

(10) Patent No.: US 10,137,860 B2
(45) Date of Patent: Nov. 27, 2018

(54) REMOTE KEYLESS ENTRY MESSAGE AUTHENTICATION

(71) Applicant: Ford Global Technologies, LLC, Dearborn, MI (US)

(72) Inventors: Mark Andre Zielinski, Bloomfield Hills, MI (US); Kevin Thomas Hille, Plymouth, MI (US); Xin Ye, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/354,631

(22) Filed: Nov. 17, 2016

(65) Prior Publication Data

US 2018/0134253 A1    May 17, 2018

(51) Int. Cl.
| | |
|---|---|
| *G07C 9/00* | (2006.01) |
| *B60R 25/24* | (2013.01) |
| *H04L 9/06* | (2006.01) |
| *H04L 9/08* | (2006.01) |
| *H04L 9/32* | (2006.01) |

(52) U.S. Cl.
CPC ........ B60R 25/241 (2013.01); G07C 9/00309 (2013.01); H04L 9/0618 (2013.01); H04L 9/0861 (2013.01); H04L 9/32 (2013.01); *G07C 2009/00507* (2013.01); *H04L 2209/805* (2013.01)

(58) Field of Classification Search
CPC ............ G07C 9/00007; G07C 9/00309; H04L 9/0618
USPC ...................................................... 340/5.72
See application file for complete search history.

(56) References Cited

U.S. PATENT DOCUMENTS

| | | | | |
|---|---|---|---|---|
| 5,142,579 | A * | 8/1992 | Anderson | ............. H04L 9/3093 |
| | | | | 380/285 |
| 6,026,165 | A | 2/2000 | Marino et al. | |
| 6,166,650 | A | 12/2000 | Bruwer | |
| 6,829,357 | B1 | 12/2004 | Alrabady et al. | |
| 7,231,041 | B2 * | 6/2007 | Forest | ..................... B60R 25/24 |
| | | | | 380/278 |
| 9,544,075 | B2 * | 1/2017 | Altman | .................. H04H 60/90 |

(Continued)

FOREIGN PATENT DOCUMENTS

| | | |
|---|---|---|
| CN | 102081812 A | 6/2011 |
| CN | 101866534 B | 3/2013 |

(Continued)

OTHER PUBLICATIONS

Search Report dated May 3, 2018 for GB Patent Application No. GB 1718787.3 (3 pages).

*Primary Examiner* — Vernal Brown
(74) *Attorney, Agent, or Firm* — James P. Muraff; Neal, Gerber & Eisenberg LLP

(57) ABSTRACT

Method and apparatus are disclosed for remote keyless entry authentication. An example remote keyless entry system includes a key fob and a vehicle. The key fob generates a secured message with a plaintext space and a ciphertext space. The vehicle (i) determines whether the key fob may be authorized based on first information in the plaintext space, (ii) decrypts an encrypted value in the ciphertext space based on a predicted full counter value, and (iii) determines whether the key fob is authorized based on second information in the encrypted value.

15 Claims, 6 Drawing Sheets

(56) References Cited

U.S. PATENT DOCUMENTS

| | | | |
|---|---|---|---|
| 2003/0011485 A1* | 1/2003 | Alrabady | G08C 19/28 340/12.52 |
| 2008/0122594 A1 | 1/2008 | Brecht et al. | |
| 2014/0341373 A1* | 11/2014 | Song | H04L 9/0869 380/28 |
| 2018/0089918 A1 | 3/2018 | Murray et al. | |

FOREIGN PATENT DOCUMENTS

| | | |
|---|---|---|
| CN | 104168109 A | 11/2014 |
| CN | 104851257 A | 8/2015 |
| DE | 4223258 C2 | 6/1994 |
| JP | 2016046649 A | 4/2016 |

\* cited by examiner

REMOTE KEYLESS ENTRY MESSAGE AUTHENTICATION

TECHNICAL FIELD

The present disclosure generally relates to remote keyless entry for a vehicle and, more specifically, remote keyless entry authentication.

BACKGROUND

A remote keyless entry system facilitates controlling some functions of a vehicle using a key fob. For example, the key fob may be used to lock and unlock doors, open a trunk, trigger an alarm, start and stop the engine, etc. The key fob sends a signal to the vehicle to wake the vehicle perform the expected action. The key fob includes a transmitter identifier code (TIC) that uniquely identifies the key fob. The vehicle includes maintains a list of TICs that are authorized to control the vehicle's functions. The vehicle includes the TICs through a pairing process.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for remote keyless entry authentication. An example remote keyless entry system includes a key fob and a vehicle. The key fob generates a secured message with a plaintext space and a ciphertext space. The vehicle (i) determines whether the key fob may be authorized based on first information in the plaintext space, (ii) decrypts an encrypted value in the ciphertext space based on a predicted full counter value, and (iii) determines whether the key fob is authorized based on second information in the encrypted value.

An example disclosed key fob includes memory to store a counter value and a key fob identifier, a processor. The example processor is to (i) generate, with an encryption algorithm and an encryption key, an encrypted counter value, (ii) generate an authentication tag by performing a bitwise XOR with the encrypted counter value on a first portion of the counter value and a first portion of the key fob identifier; (iii) generate a secured message with a plaintext space and a ciphertext space. The authentication tag is located in the cipher text space.

An example disclosed remove keyless entry system of a vehicle includes memory to store a plurality of authorized key fob identifiers and a vehicle counter value, and a processor. In response to receiving a secured message from a key fob that includes a plaintext space and a ciphertext space, the example processor (a) makes a first determination of whether the key fob that sent the secured message is authorized based on a portion of a key fob identifier included in the plaintext space and corresponding portions of the plurality of authorized key fob identifiers, (b) predicts a full counter value based on the vehicle counter value and a first portion of a key fob counter value included in the plaintext space, (c) decrypts an encrypted value from the ciphertext space based on the predicted full counter value (d) makes a second determination based on the plurality of authorized key fob identifiers, information in the encrypted value, and the predicted full counter value, and (e) performs an action identified by an action code included in the encrypted value when the key fob is authorized.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
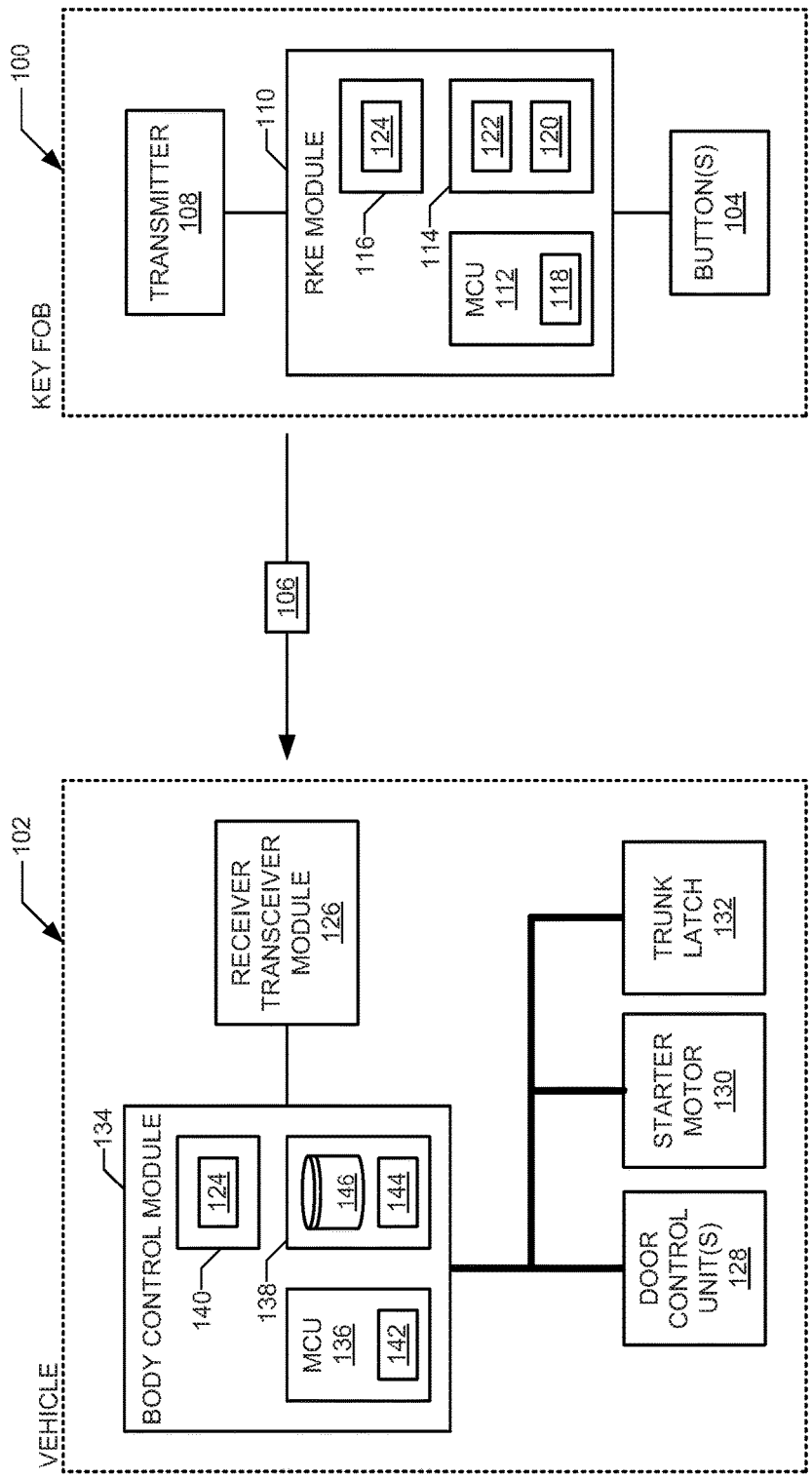
FIG. 1 illustrates a key fob and a vehicle interacting in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Messages from a key fob to a remote keyless entry system often include a wake-up pattern, a transmitter identifier code (TIC), an action code, a rolling code, and a message authentication code (MAC). The wake-up patterns wakes the vehicles that receive the message. The TIC uniquely identifies the key fob. The action code identifies the action to be performed. The rolling code changes for every message to ensure that the signal is good for only one time to prevent replay attacks. The MAC is a cryptographic protection that ensures the integrity and authentication of the message. In general, customers are more satisfied with the remote keyless entry system when the range of the key fob is longer and the battery of the key fob lasts longer. Shorter messages (in bytes) increase the range of the key fob and conserve the battery life of the key fob. However, traditionally, security measures (such as the MAC) tend to increase the length of the messages.

As disclosed below, the remote keyless entry system generates secure messages that are shorter than the traditional key fob message while maintaining the security of the message. The secure message includes a plaintext space and a ciphertext space. To generate the secured message, the key fob uses the TIC, the rolling code (sometimes referred to herein as a "counter value"), and the action code. Using the full counter value and an encryption key, the key fob creates an encrypted value (sometimes referred to as an "authentication tag") by encrypting a first portion of the TIC, a first portion of the counter value, and the action code. To generate the message, the key fob places a second portion of the TIC and a second portion of the counter value in the plaintext space and the encrypted value in the ciphertext space. In some examples, the secured message is nine byte with a four-byte plaintext space and a five-byte ciphertext space. The key fob then transmits the secured message.

Upon receiving the secured message, the vehicles within range wake up. A vehicle that wakes up determines whether the message is possibly destined for it by comparing the authorized TICs stored in its memory with the second portion of the TIC in the plaintext space of the secured message. For example, if the second portion of the TIC is the two most significant bytes of the key fob's TIC, the vehicle compares the second portion of the TIC to the two most significant bytes of the authorized TICs stored in memory. If the second portion of the TIC matches one of the second portions of the authorized TICs, the vehicle remains awake to further process the secured message. Otherwise, the remote keyless entry system of the vehicle returns to a sleep mode.

The vehicle predicts the full counter value based on (a) the second portion of the counter value in plaintext space of the secured message, and (b) a counter value stored in the memory of the vehicle. Using the predicted full counter value and an encryption key stored in the memory of the vehicle, the vehicle generates a decrypted value by attempting to decrypt the encrypted value in the ciphertext space of the secured message. If the key fob is authorized to access the vehicle, the encryption key of the key fob and the encryption in the vehicle's memory associated with the TIC will be the same and the decrypted value will include the first portion of the TIC, the first portion of the counter value, and the action code. With the first and second portions of the TIC and the first and second portions of the counter value, the vehicle compares the TIC and the counter value associated with the secured message to the authorized TIC and the counter value stored in the vehicle's memory. If (i) the TIC associated with the secured message matches one of the authorized TICs and (ii) the predicted full counter value matches the actual full counter value, then the vehicle performs the action specified by the action code. Otherwise, the vehicle returns to the sleep mode without performing the action.

FIG. 1 illustrates a key fob 100 and a vehicle 102 interacting in accordance with the teachings of this disclosure. The key fob 100 is configured to remotely instruct the vehicle 102 to (a) lock and unlock the doors of the vehicle 102, start and stop the engine of the vehicle 102, and/or unlatch the trunk of the vehicle 102, etc. The key fob includes buttons 104 that, when pressed, cause the key fob 100 to send a secured message 106 to the vehicle 102 as disclosed below. In the illustrated example, the key fob 100 includes the buttons 104, a transmitter 108, and a remote keyless entry (RKE) module 110.

The buttons 104 are associated with actions codes (e.g., the action codes 212 of FIG. 2 below). The action codes are binary values that each identify an action for the vehicle 102 to perform. For example, a first button 104 may be associated with the action code to unlock the doors of the vehicle 102, and a second button 104 may be associated with the action code to lock the doors of the vehicle 102.

The transmitter 108 includes a radio and an antenna to broadcast the secured messages 106 generated by the RKE module 110. The transmitter 108 is configured to have a range of approximately 15 feet to 50 feet. Additionally, the transmitter 108 is tuned to a particular operating frequency. For example, the operating frequency may be 315 MHz (for North America) or 433.92 MHz (for Europe).

The RKE module 110 generates the secured messages 106 in response to one of the buttons 104 being pressed. The RKE module 110 broadcasts the secured messages 106 via the transmitter 108. In the illustrated example, the RKE module 110 includes a processor or controller 112, memory 114 and 116, and a message securer 118.

The processor or controller 112 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). In the illustrated example, the processor or controller 112 is structured to include the message securer 118. The memory 114 and 116 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 114 and 116 includes multiple kinds of memory, particularly volatile memory and non-volatile memory. In the illustrated example, a counter value 120 and a transmitter identifier code (TIC) 122 are stored in the memory 114. The secure memory 116 includes an embedded hardware encryption engine with its own authentication keys to securely store information. The cryptographic algorithm of the hardware encryption engine encrypts data stored in the secure memory 116. In the illustrated example, an encryption key 124 is stored in the secure memory 116

The memory 114 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 114, the computer readable medium, and/or within the processor 112 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

As disclosed in more detail in FIG. 2 below, the message securer 118 generates the secured messages 106 based on (a) the counter value 120, the TIC 122, and the encryption key 124 stored in memory 114 and 116, and (b) the action code associated with the pressed button. The message securer 118 increments the counter value 120 when the message securer 118 broadcasts the secured message 106. In such a manner, the counter value 120 used to generate the secured message 106 is different for each secured message 106 until the counter repeats or is reset. The TIC 122 is a static value that uniquely identified the key fob 100. The message securer 118 generates an encrypted value by encrypting a first portion of the counter value 120 with the action code and a first portion of the TIC 122. The message securer 118 places a second portion of the counter value 120 and a second portion of the TIC 122 in a plaintext portion of the secured message 106 and the encrypted value in a ciphertext portion of the secured message. The message securer 118 broadcasts the secured message 106 via the transmitter 108.

The vehicle 102 may be a standard gasoline powered vehicle, a hybrid vehicle, an electric vehicle, a fuel cell vehicle, and/or any other mobility implement type of vehicle. The vehicle 102 includes parts related to mobility, such as a powertrain with an engine, a transmission, a suspension, a driveshaft, and/or wheels, etc. The vehicle 102 may be non-autonomous, semi-autonomous (e.g., some routine motive functions controlled by the vehicle 102), or autonomous (e.g., motive functions are controlled by the vehicle 102 without direct driver input). In the illustrated example, the vehicle 102 includes a receiver transceiver module 126, door control units 128, a starter motor 130, a trunk latch 132, and a body control module 134.

The receiver transceiver module 126 includes antenna to receive the secured message 106 from the key fob 100. In some examples, the receiver transceiver module 126 is tuned to receive the secured message 106 from the key fob 100 at a medium-range frequency (e.g., 315 MHz to 902 MHz, etc.).

The door control units 128 are each associated with a corresponding one of the doors of the vehicle 102. The door control unit 128 various functions related to the door. For example, the door control unit 128 may control a latch to lock and unlock the door, positions of a side view mirror, and the position of the corresponding window. The door control unit 128 includes an electronic circuit (e.g., discrete components, integrated circuits, a processor, etc.) to control actuators that move the window and control the latch. In the illustrated example, the starter motor 130 starts the engine of the vehicle 102 in response to receiving a command from the body control module 134. The trunk latch 132, when closed, latches the trunk (or rear door) of the vehicle closed. The trunk latch 132 unlatches in response to a command from the body control module 134.

The body control module 134 controls various subsystems of the vehicle 102. The body control module 134 is communicatively coupled to the receiver transceiver module 126 to receive the secured messages 106 from the key fob 100. In the illustrated example, the body control module 134 is communicatively coupled to the door control units 128, the starter motor 130, and the trunk latch 132 to control the engine, doors, and trunk of the vehicle 102. In the illustrated example, the body control module 134 includes a processor or controller 136, memory 138 and 140, and a key fob authenticator 142.

The processor or controller 136 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). In the illustrated example, the processor or controller 136 is structured to include the key fob authenticator 142. The memory 138 and 140 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 138 and 140 includes multiple kinds of memory, particularly volatile memory and non-volatile memory. In the illustrated example, a vehicle counter value 144 and one or more authorized TIC 146 are stored in the memory 138. The secure memory 140 includes an embedded hardware encryption engine with its own authentication keys to securely store information. The cryptographic algorithm of the hardware encryption engine encrypts data stored in the secure memory 140. In the illustrated example, the encryption key 124 is stored in the secure memory 140.

The memory 114 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 114, the computer readable medium, and/or within the processor 112 during execution of the instructions.

As disclosed in more detail in FIG. 3 below, the key fob authenticator 142 determines whether the secured message 106 is one of the key fobs 100 authorized to communicate with the vehicle 102. Initially, the key fob authenticator 142 compares the portion of the TIC 122 in the plaintext space of the secured message 106 to corresponding portions of the authorized TICs 146 stored in the memory 138. If none of the corresponding portions of the authorized TICs 146 match, the key fob authenticator 142 ignores the secured message 106. In some examples, the key fob authenticator 142 then returns the body control module 134 to a sleep mode.

Otherwise, the key fob authenticator 142 generates a predicted full counter value (e.g., the predicted full counter value 308 of FIG. 3 below) based on (a) the portion of the counter value 120 in the plaintext space of the secured message 106, and (b) the vehicle counter value 144 stored in the memory 138. Based on the predicted full counter value, the key fob authenticator 142 attempts to decrypt the encrypted value in the ciphertext portion of the secured message 106 with the encryption key 124. The key fob authenticator 142 combines the portion of the counter value 120 in the plaintext portion of the secured message 106 with the data in the decrypted encrypted value that represents the remaining portion of the counter value 120 to generate a reconstructed counter value (e.g., the reconstructed counter value 310 of FIG. 3 below). Additionally, the key fob authenticator 142 combines the portion of the TIC 122 in the plaintext portion of the secured message 106 with the data in the decrypted encrypted value that represents the remaining portion of the TIC 122 to generate a reconstructed TIC (e.g., the reconstructed TIC 312 of FIG. 3 below). The key fob authenticator 142 compares the reconstructed TIC to the authorized TICs 146 and the reconstructed counter value to the predicted counter value. If both do not match, the key fob authenticator 142 ignores the secured message 106. Otherwise, the key fob authenticator 142 provides the action code to the body control module 134.

Figure 2:
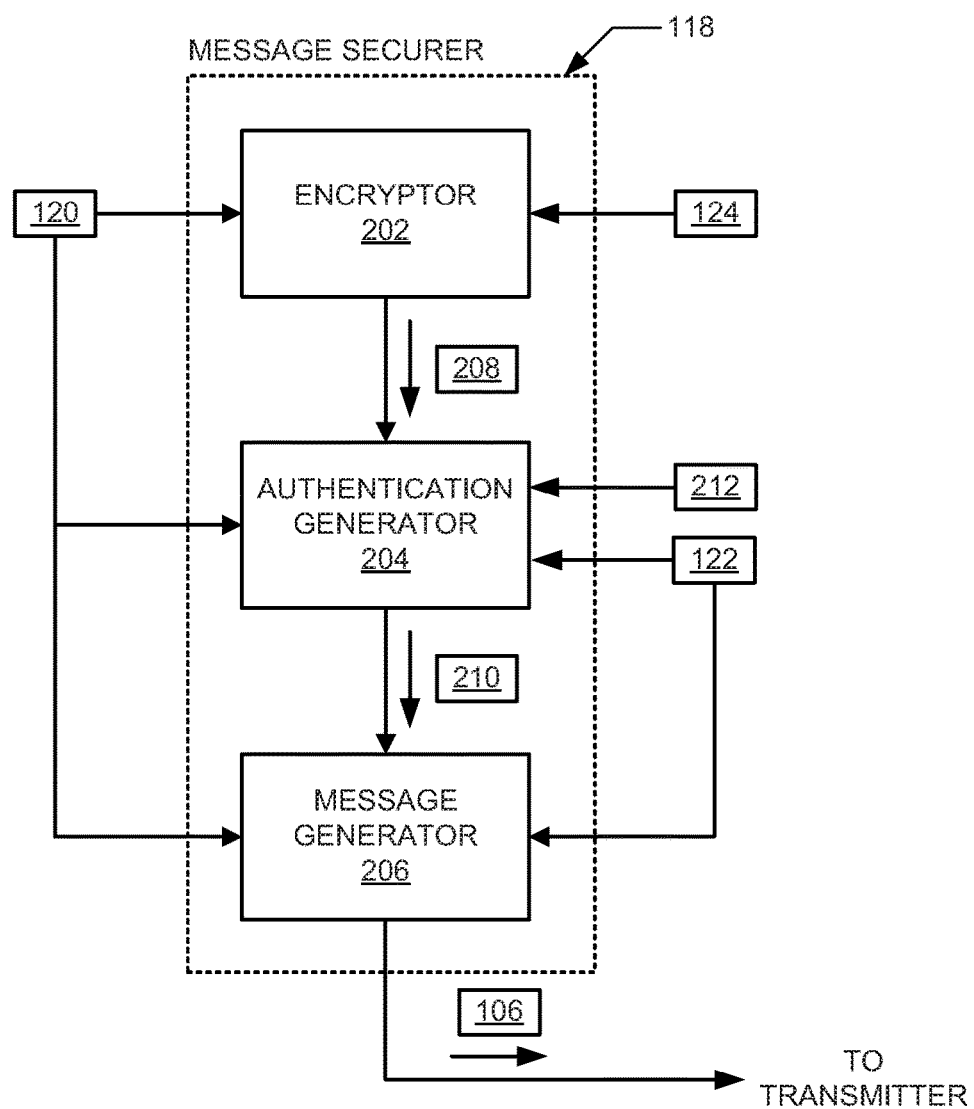
FIG. 2 is a block diagram of a message securer of the key fob of FIG. 1.

FIG. 2 is a block diagram of the message securer 118 of the key fob 100 of FIG. 1. In the illustrated example, the message securer 118 includes an example encryptor 202, an example authentication generator 204, and an example message generator 206.

The counter value 120 is a multi-byte value. In some examples, the counter value 120 has a length of four bytes. As used herein, the four bytes of the counter value 120 may be referred to as "$C_1C_2C_3C_4$," where $C_1$ is the most significant byte and $C_4$ is the least significant byte. The TIC 122 multi-byte value. In some examples, the TIC 122 has a length of four bytes. As used herein, the four bytes of the TIC 122 may be referred to as "$T_1T_2T_3T_4$," where $T_1$ is the most significant byte and $T_4$ is the least significant byte.

The encryptor 202 implements an encryption algorithm based on the encryption key 124 to generate an encrypted counter value 208 of the counter value 120 stored in memory 114. The encryption algorithm may be any suitable encryption algorithm, such as Advanced Encryption Standard (AES). Before applying the encryption algorithm, the encryptor 202 pads the counter value 120 by adding bytes to the counter value 120. In some examples, the encryptor 202 quadruples the length of the counter value 120. For example, if the counter value 120 is four bytes, the encryptor 202 may add twelve bytes. The encrypted counter value 208 is the length of the counter value 120 with the extra bytes. For example, the encrypted counter value 208 may be sixteen bytes.

The authentication generator 204 generates an encrypted value 210 based on the encrypted counter value 208. The authentication generator 204 selects a portion of the encrypted counter value 208. In some examples, the selected portion is five bytes. In such example, the selected portion may be any five-byte portion as long as the key fob authenticator uses the same five byte positions. In some such examples, the authentication generator 204 selects the five most significant bytes of the encrypted counter value 208. The authentication generator 204 combines a first portion of the counter value 120 (e.g., the first two most significant bytes ($C_1C_2$)) with a first portion of the TIC 122 (e.g., the first two most significant bytes ($T_1T_2$)) and the action code 212. The authentication generator 204 then performs a bitwise operation (e.g., an exclusive-or (XOR) operation) on the combined bytes and the selected portion of the encrypted counter value 208 to generate the encrypted value 210.

The message generator 206 generates the secured message 106. The message generator 206 selects a second portion of the counter value 120 (e.g., the two least significant bytes ($C_3C_4$)) and a second portion of the TIC 122 (e.g., the two least significant bytes ($T_3T_4$)). The message generator 206 places the selected portions of the counter value 120 and the TIC 122 in the plaintext portion of the secured message 106. The message generator 206 places the encrypted value 210 into the ciphertext space of the secured message 106. The message generator 206 then forwards the secured message to the transmitter 108 to be broadcast.

Figure 3:
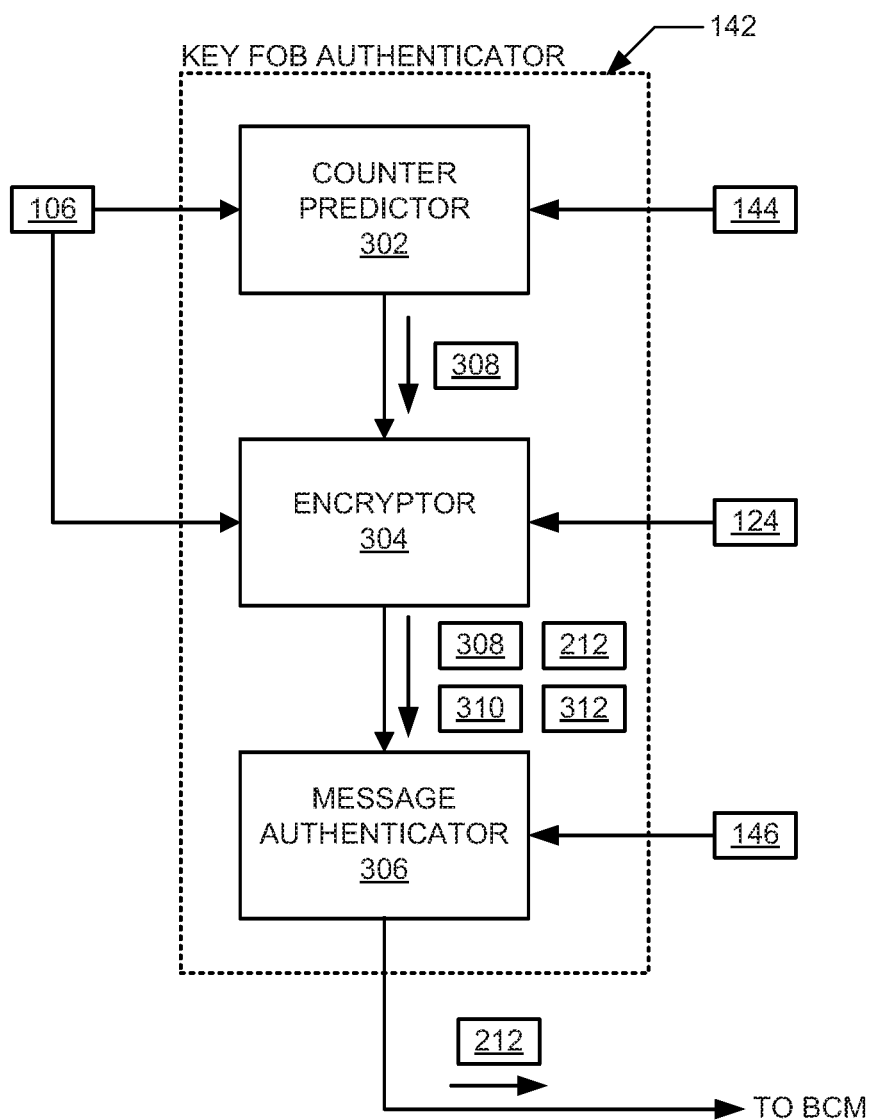
FIG. 3 is a block diagram of a key fob authenticator of the vehicle of FIG. 1.

FIG. 3 is a block diagram of a key fob authenticator 142 of the vehicle 102 of FIG. 1. In the illustrated example, the key fob authenticator 142 includes an example counter predictor 302, an example encryptor 304, and an example message authenticator 306.

The example counter predictor 302 generates a predicted full counter value 308 based on (a) the portion of the counter value 120 (e.g., $C_3C_4$) in the plaintext space of the secured message 106 and (b) the vehicle counter value 144. As used herein, the four bytes of the vehicle counter value 144 may be referred to as "$C'_1C'_2C'_3C'_4$," where $C'_1$ is the most significant byte and $C'_4$ is the least significant byte. The counter predictor 302 attempts to determine the predicted full counter value 308 so that the predicted full counter value 308 is equal to the counter value 120. In some examples, the counter predictor 302 the next possible value of a counter value based on the vehicle counter value 144 the portion of the counter value 120 (e.g., $C_3C_4$). Example predicted full counter value 308 are shown on Table (1) below (in hexadecimal).

TABLE (1)

| $C'_1C'_2C'_3C'_4$ | $C_3C_4$ | Example Predicted Full Counter Value |
|---|---|---|
| 0x 0B F1 7B 33 75 0D | 0x 75 1E | 0x 0B F1 7B 33 75 1E |
| 0x B7 F9 13 72 F4 5C | 0x F5 5D | 0x B7 F9 13 72 F5 5D |
| 0x 28 6E 27 2B F9 2D | 0x 0E 51 | 0x 28 6E 27 2C 0E 51 |
| 0x FF FF FF FF FF BA | 0x 00 47 | 0x 00 00 00 00 00 47 |

The encryptor 304 determines whether a corresponding portion of any of the authorized TIC 146 stored in memory 138 matches the portion of the TIC 122 included in the plaintext space of the secured message. The encryptor 304 implements the same encryption algorithm as the encryptor 202 of the message securer 118. The encryptor 304 uses the encryption key(s) 124 associated with the matched one(s) of the authorized TIC 146. If the matched one of the authorized TIC 146 is actually a match to the TIC 122, the encryption key 124 is the same as the one stored in the secure memory 116 of the key fob 100. The encryptor 304 generates an encrypted full counter value. Before applying the encryption algorithm, the encryptor 304 pads the predicted full counter value 308 by adding bytes to the predicted full counter value 308. In some examples, the encryptor 304 quadruples the length of the predicted full counter value 308. For example, if the predicted full counter value 308 is four bytes, the encryptor 304 may add twelve bytes. The encrypted full counter value is the length of the counter value 120 with the extra bytes. For example, the encrypted counter value 208 may be sixteen bytes.

The encryptor 304 selects a portion of the encrypted full counter value. The encryptor 304 selects the same byte locations as the authentication generator 204 of the message securer 118. For example, the encryptor 304 may select the five most significant bytes of the encrypted full counter value. The encryptor 304 then performs the bitwise operation (e.g., the exclusive-or (XOR) operation) on the encrypted value 210 in the ciphertext space of the secured message 106. This generates a predicted second portion of the counter value 120, a predicted second portion the TIC 122, and the action code 212. The encryptor 304 combines the first portion of the counter value 120 from the plaintext space of the secured message 106 and the predicted second portion of the counter value 120 to create a reconstructed counter value 310. The encryptor 304 combines the first portion of the TIC 122 from the plaintext space of the secured message 106 and the predicted second portion of the TIC 122 to create a reconstructed TIC 312.

The message authenticator 306 determines whether the secured message 106 is from a key fob 100 authorized to communicate with the vehicle 102. The message authenticator 306 compares the reconstructed TIC 312 to the authorized TICs 146 stored in them memory 138. If the reconstructed TIC 312 does not match any of the authorized TICs 146, the message authenticator 306 ignores the action code 212. If the reconstructed TIC 312 does match one of the authorized TICs 146, the message authenticator 306 compares the predicted full counter value 308 with the reconstructed counter value 310. If they do no match, the message authenticator 306 ignores the action code 212. If the predicted full counter value 308 and the reconstructed counter value 310 match, the message authenticator 306 forwards the action code 212 to the body control module 134 to perform the associated action (e.g., unlock the doors, etc.).

Figure 4:
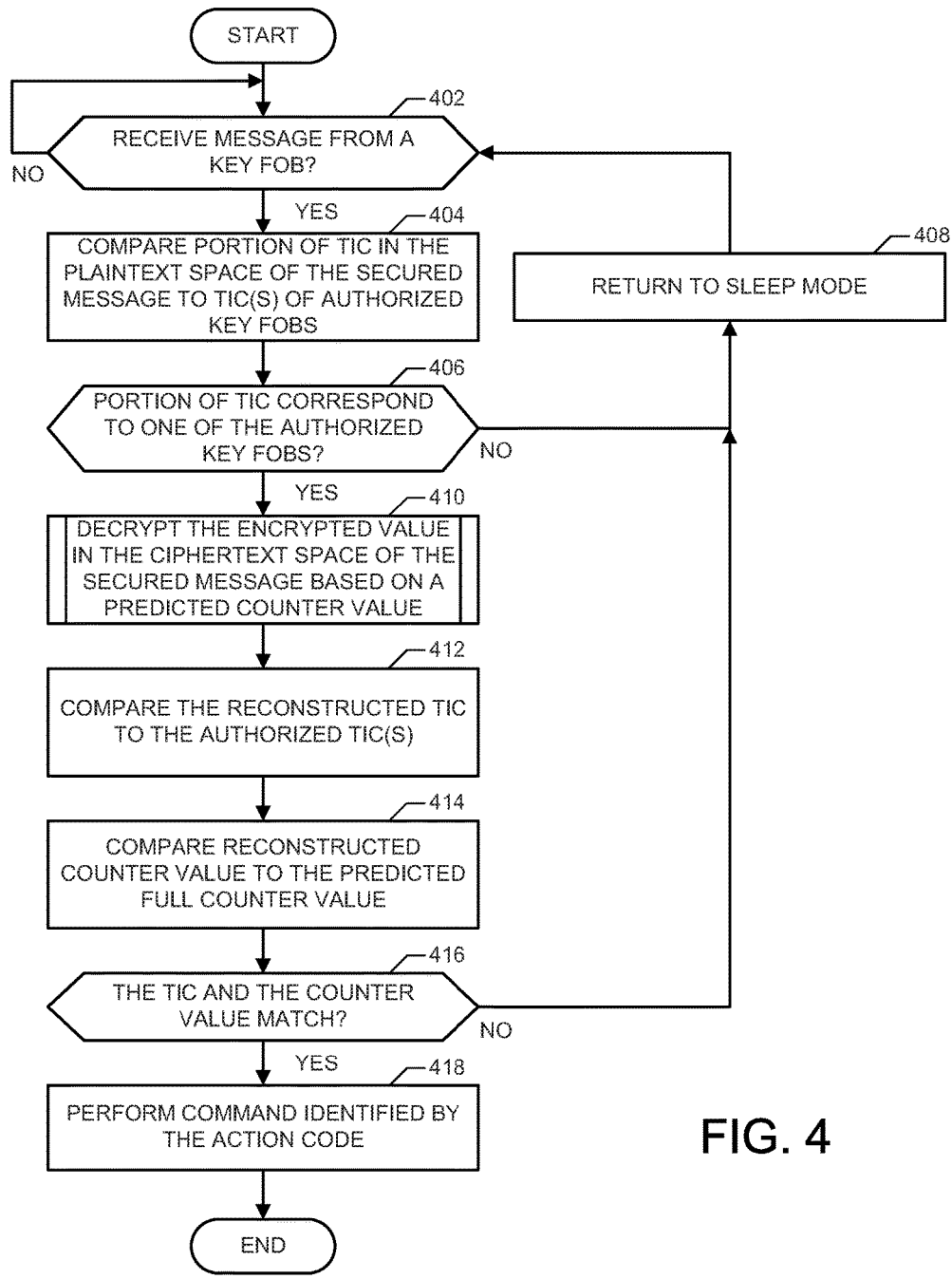
FIG. 4 is a flowchart of a method to determine whether the key fob of FIG. 1 is authorized to control functions of the vehicle of FIG. 1.

FIG. 4 is a flowchart of a method to determine whether the key fob 100 of FIG. 1 is authorized to control functions of the vehicle 102 of FIG. 1. Initially, at block 402, the key fob authenticator 142 waits until the secured message 106 is received by the receiver transceiver module 126. In some examples, the body control module 134 and the receiver transceiver module 126 are in a low-power sleep mode to conserve the battery life of the vehicle 102. In such examples, the receiver transceiver module 126 may wake up from time-to-time to detect any secured message 106 sent by the key fob 100. At block 404, the key fob authenticator 142 compares the portion of the TIC 122 in the plaintext space of the secured message 106 to the corresponding portions of the authorized TICs 146. For example, if the portion of the TIC 122 in the plaintext space of the secured message 106 is the two most significant bytes (e.g., $T_1T_2$) of the TIC 122, the key fob authenticator 142 may use the two most significant bytes of the authorized TICs 146 when making the comparison. At block 406, the key fob authenticator 142 determines, based on the comparison at block 404, whether the key fob 100 may be authorized if the portion of the TIC 122 in the plaintext space of the secured message 106 matches the corresponding portion of one of the authorized TICs 146. If the key fob 100 is not authorized, the method continues to block 408. Otherwise, if the key fob 100 may be authorized, the method continues at block 410. At block 408, the key fob authenticator 142 returns the receiver transceiver module 126 and the body control module 134 to the low-power sleep mode.

At block 410, the key fob authenticator 142 decrypts the encrypted value 210 in the ciphertext space of the secured message to generate a reconstructed counter value 310, a reconstructed TIC 312, and the action code 212. An example method of decrypting the encrypted value 210 is disclosed in FIG. 6 below. At block 412, the key fob authenticator 142 compares the reconstructed TIC 312 to the authorized TIC(s) 146 identified at block 404. At block 414, the key fob authenticator 142 compares the reconstructed counter value 310 to the predicted full counter value 308. At block 416, the key fob authenticator 142 determines whether the reconstructed TIC 312 matches one of the authorized TICs 146 and the reconstructed counter value 310 matches the predicted full counter value 308. If the reconstructed TIC 312 and the reconstructed counter value 310 both match their corresponding value, the method continues to block 418. Otherwise, if one of the reconstructed TIC 312 or the reconstructed counter value 310 does not match its corresponding value, the method returns to block 408. At block 418, the body control module 134 performs the command identified by the action code 212.

Figure 5:
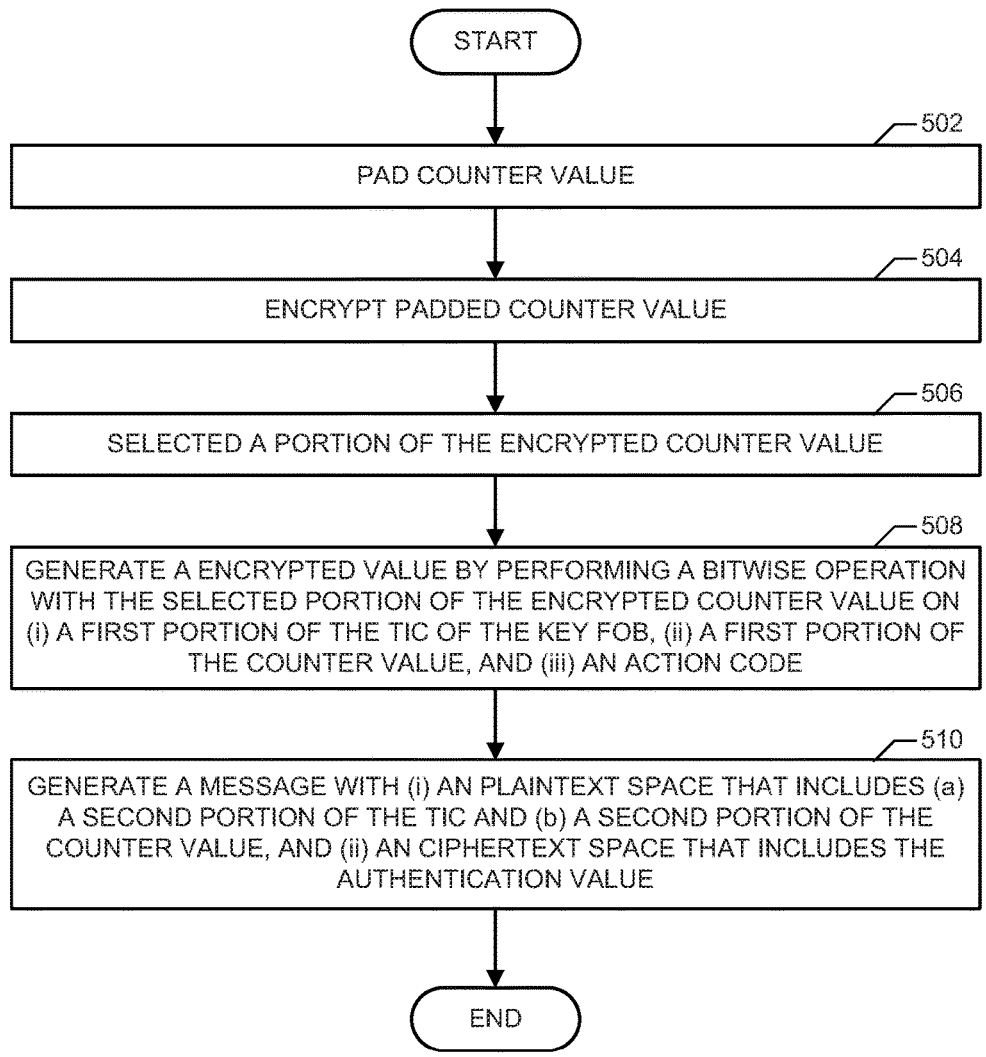
FIG. 5 is a flowchart of a method to generate a secured message by the key fob of FIG. 1.

FIG. 5 is a flowchart of a method to generate the secured message 106 by the key fob 100 of FIG. 1. Initially, at block 502, the encryptor 202 pads the counter value 120 stored in memory 114 with extra bytes to increase the length (in bytes) of the counter value 120. (e.g., from four bytes to sixteen bytes, etc.). At block 504, the encryptor 202 encrypted the padded counter value 120 with the encryption algorithm (e.g., AES, etc.) and the encryption key 124. At block 506, the authentication generator 204 selects a portion of the encrypted padded counter value 120. In some examples, the authentication generator 204 selects the five most significant bytes of the encrypted padded counter value 120.

At block 508, the authentication generator 204 generates the encrypted value 210 by performing a bitwise operation (e.g., the XOR operation) of the selected bytes of the encrypted padded counter value 120 on the first portion of the TIC 122 (e.g., $T_3T_4$), the first portion of the counter value 120 (e.g., $C_3C_4$), and the action code 212. In some examples, the first portion of the TIC 122 includes the two least significant bytes of the TIC 122, and the first portion of the counter value 120 includes the two least significant bytes of the counter value 120. At block 510, the authentication generator 204 generates the secured message 106 with the plaintext space and the ciphertext space. The authentication generator 204 places the second portion of the TIC 122 (e.g., $T_1T_2$) and the second portion of the counter value 120 (e.g., $C_1C_2$) in the plaintext space. In some examples, the second portion of the TIC 122 includes the two most significant bytes of the TIC 122, and the second portion of the counter value 120 includes the two most significant bytes of the counter value 120. The authentication generator 204 places the encrypted value 210 generated at block 508 into the ciphertext space.

Figure 6:
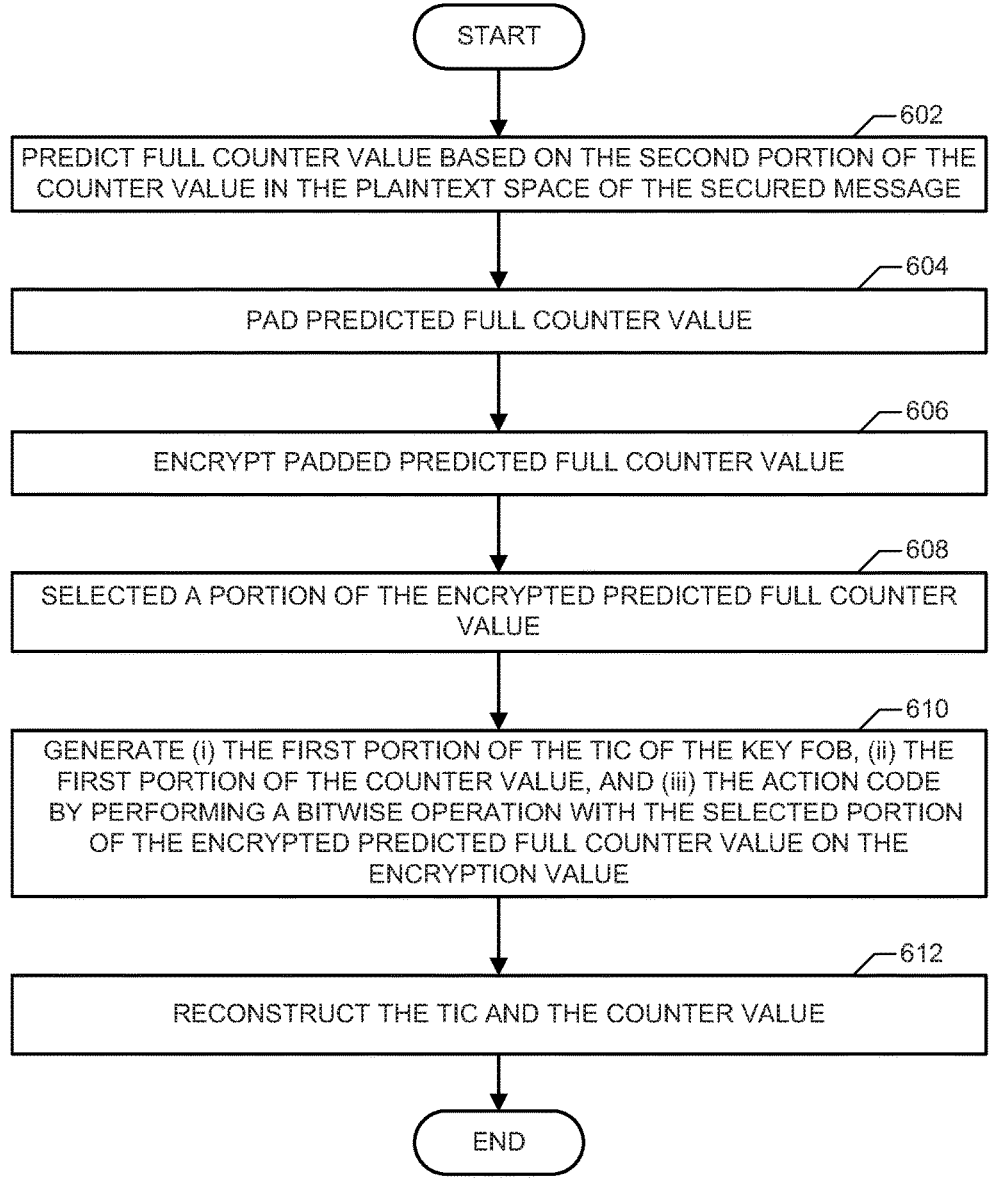
FIG. 6 is a flowchart of a method to authenticate the secured message by the vehicle of FIG. 1.

FIG. 6 is a flowchart of a method to authenticate the secured message 106 by the vehicle 102 of FIG. 1. Initially, at block 602, the counter predictor 302 predicts a full counter value 308 based on the first portion of the counter value 120 in the plaintext space of the secured message 106 and the vehicle counter value 144 stored in the memory 138. At block 604, the encryptor 304 pads the predicted full counter value 308 with extra bytes to increase the length (in bytes) of the predicted full counter value 308. (e.g., from four bytes to sixteen bytes, etc.). At block 606, the encryptor 304 encrypts the predicted full counter value 308 with the encryption key 124 associated with one of the authorized TICs 146. At block 608, the encryptor 304 selects a portion of the encrypted predicted full counter value 308. In some examples, the encryptor 304 selects the five most significant bytes of the encrypted predicted full counter value 308.

At block 610, the encryptor 304 generates the first portion of the counter value 120, the first portion of the TIC 122, and the action code 212 by performing a bitwise operation (e.g., the XOR operation) with the selected portion of the encrypted predicted full counter value 308 on the encrypted value 210 from the ciphertext space of the secured message 106. At block 612, the encryptor 304 generates the reconstructed counter value 310 with the first portion of the counter value 120 generated at block 610 and the second portion of the counter value 120 in the plaintext space of the secured message 106. Additionally, the encryptor 304 generates the reconstructed TIC 312 with the first portion of the TIC 122 generated at block 610 and the second portion of the TIC 122 in the plaintext space of the secured message 106.

The flowcharts of FIGS. 4 and 6 are representative of machine readable instructions stored in memory (such as the memory 138 of FIG. 1) that comprise one or more programs that, when executed by a processor (such as the processor 136 of FIG. 1), cause the vehicle 102 to implement the example key fob authenticator 142 of FIGS. 1 and 3. The flowchart of FIG. 5 is representative of machine readable instructions stored in memory (such as the memory 114 of FIG. 1) that comprise one or more programs that, when executed by a processor (such as the processor 112 of FIG. 1), cause the key fob 100 to implement the example message securer 118 of FIGS. 1 and 2. Further, although the example program(s) is/are described with reference to the flowcharts illustrated in FIGS. 4, 5, and 6, many other methods of implementing the example message securer 118 and the example key fob authenticator 142 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A remote keyless entry system, comprising:
a key fob to:
pad a fob count;
generate an encrypted counter value by encrypting the padded fob count value based on an encryption key;
generate an encrypted value by performing a bitwise XOR on the encrypted counter value with an action code, a first portion of the fob count, and a first portion of an identifier code;
generate a plaintext including a second portion of the fob count and a second portion of the identifier code;
generate a ciphertext including the encrypted value; and
a vehicle to:
generate a predicted full counter value based on the second portion of the fob count and a vehicle count;
generate an encrypted prediction using the predicted full counter value using the encryption key;
generate the first portion of the fob count, the first portion of the identifier code, and the action code by performing the bitwise XOR on the encrypted value with the encrypted prediction; and
when the first portion of the fob count and the second portion of the fob count reconstructed together match the predicted full counter value, authorize the key fob.

2. The system of claim 1, wherein the vehicle is to:
decrypt the action code from the encrypted value using a selected portion of the encrypted prediction; and
perform an action identified by the action code when the key fob is authorized.

3. The system of claim 1, wherein the vehicle stores a plurality of authorized identifier codes, and wherein the first portion of the identifier code and the second portion of the identifier code are reconstructed together to be compared to the plurality of authorized identifier codes.

4. The system of claim 1, wherein the first portion of the identifier code is a half of the identifier code that includes most significant bytes of the identifier code, and the second portion of the identifier code is the other half of the identifier code that includes least significant bytes of the identifier code.

5. The system of claim 1, wherein the vehicle is to compare the second portion of the identifier code to a corresponding portion of an authorized identifier code to determine whether the key fob is to be authorized.

6. The system of claim 1, wherein the vehicle is to:
reconstruct the identifier code based on the second portion of the identifier code from the plaintext and the first portion of the identifier code from the encrypted value.

7. A key fob comprising:
a processor to:
pad a counter value;
generate a first value by encrypting the padded counter value based on an encryption key;
generate a second value by performing a bitwise XOR on the first value with an action code and portions of the counter value and an identifier code;
generate a plaintext including remaining portions of the counter value and the identifier code; and
generate a ciphertext including the second value.

8. The key fob of claim 7, wherein the encryption key is stored in secure memory.

9. The key fob of claim 7, wherein the processor is to select a portion of the first value from predetermined byte positions.

10. The key fob of claim 9, wherein the selected portion of the first value is a number of most significant bytes of the first value.

11. The key fob of claim 10, wherein a number of the most significant bytes equals half of a length of the counter value, half of a length of the identifier code, and a length of the action code.

12. The key fob of claim 9, wherein the portions of the counter value and the identifier code include a first portion of the counter value and a first portion of the identifier code, and the remaining portions of the counter value and the identifier code include a second portion of the counter value and a second portion of the identifier code.

13. The key fob of claim 12, wherein the first portion of the identifier code is a half of the identifier code that includes most significant bytes of the identifier code, and the second portion of the identifier code is the other half of the identifier code that includes most significant bytes of the identifier code.

14. The key fob of claim 12, wherein the first portion of the counter value is a half of the counter value that includes most significant bytes of the counter value, and the second portion of the counter value is the other half of the counter value that includes least significant bytes of the counter value.

15. A remote keyless entry system of a vehicle comprising:
memory to store a plurality of authorized key fob identifiers and a vehicle counter value; and
a processor to, in response to receiving a secured message from a key fob that includes a plaintext space and a ciphertext space:
make a first determination of whether the key fob that sent the secured message is authorized based on a first portion of a key fob identifier included in the plaintext space and corresponding portions of the plurality of authorized key fob identifiers;
generate a predicted full counter value based on the vehicle counter value and a first portion of a key fob counter value included in the plaintext space;
pad the predicted full counter value;

encrypt the padded predicted full counter value using a stored encryption key associated with the first portion of the key fob identifier;
select a portion of the encrypted padded predicted full counter value;
decrypt a second portion of the key fob counter value, a second portion of the key fob identifier, and an action code from an encrypted value of the ciphertext using the selected portion of the encrypted padded predicted full counter value;
make a second determination based on the plurality of authorized key fob identifiers, the first and second portions of the key fob identifier, the first and second portions of the key fob counter values, and the vehicle counter value; and
perform an action identified by the action code when the key fob is authorized.

* * * * *